United States Patent [19]

Geller et al.

[11] Patent Number: 5,452,465

[45] Date of Patent: Sep. 19, 1995

[54] SUPERVISOR CONTROL AND DATA ACQUISITION SYSTEM AND METHOD OF OPERATION

[75] Inventors: Haim Geller, Nili; Abel Liorah, Hertzelia; Gonen Ziv-Av, Kear-Saba; Yitzhak Cohen, Yahud, all of Israel

[73] Assignee: Motorola, Inc., Schaumburg, Ill.

[21] Appl. No.: 9,174

[22] Filed: Jan. 26, 1993

[30] Foreign Application Priority Data

Feb. 1, 1992 [GB] United Kingdom ............... 9202201

[51] Int. Cl.$^6$ .................. G06F 13/10; G06F 12/00
[52] U.S. Cl. ........................ 395/800; 395/200.05; 364/130; 364/550; 364/DIG. 1
[58] Field of Search ............... 395/200, 425, 600, 325, 395/67, 800, 700, 725; 340/539, 825.15, 541

[56] References Cited

U.S. PATENT DOCUMENTS

| | | | |
|---|---|---|---|
| 4,468,728 | 8/1984 | Wang | 364/200 |
| 4,638,453 | 1/1987 | Gran et al. | 364/900 |
| 4,700,294 | 10/1987 | Haynes | 364/200 |

OTHER PUBLICATIONS

Paradox 3.5 Handbook, Third Edition, Cobb et al. Bantam Books, ISBN 0-553-35441-8 pp. 250, 275.
Data Communications: A Users Guide, Kenneth Sherman, Reston Pub. Co., ISBN 0-8359-1227-2, pp. 137, 323.

*Primary Examiner*—Alyssa H. Bowler
*Assistant Examiner*—Charles R. Kyle
*Attorney, Agent, or Firm*—Douglas D. Fekete

[57] ABSTRACT

This invention relates to a supervisory control and data acquisition (SCADA) system in which a central station (10) sends control information to, and acquires information from remote stations (11, 12) over a wire, radio or other link. Each station comprises a tabular memory (15–18) comprising storage locations in an 'x' direction for storing data relating to different elements of the second system and storage locations in a 'y' direction for storing data relating to different parameters of those elements. Transmitting means are provided for transmitting a message from one unit to the other unit, said message comprising an 'x' part, a 'y' part and a qualifier, for reading from and writing to storage locations in the tabular memory of the other unit depending on the result of a logical operation defined by the qualifier. The tabular memory can equally be considered to have a tree-like structure.

14 Claims, 2 Drawing Sheets

SUPERVISOR CONTROL AND DATA ACQUISITION SYSTEM AND METHOD OF OPERATION

This invention relates to a supervisory control and data acquisition (SCADA) system in which a central station sends control information to, and acquires information from remote stations over a wire, radio or other link and a method of operation of such a system.

SUMMARY OF THE PRIOR ART

Prior art SCADA systems are described in GB-A-2118338 and GB-A-2236606.

As SCADA systems become more and more complex, with remote units controlling and monitoring more and more aspects of a system (for example a security system for a building, an irrigation system etc.), there is a need for the exchange of more and more information over the link between the central unit and the remote units.

It is useful to tabulate data to be transferred between units, in the form of, for example, rows for different elements of a system being controlled or monitored and columns for different parameters to be controlled or monitored. Thus, for example in an irrigation system, a remote unit can store a table having a row for each valve being controlled or monitored and a column for the open/closed state of the valve, the flow rate, the temperature, etc. Motorola's MIR 5000 (trade mark) system is an example of a SCADA system having memory tables at the remote units.

In the operation of such a system, there is a need to keep the traffic between the central and the remote stations to a minimum and at the same time provide flexibility in communication.

In the design, operation and maintenance of such a system, there is a need to provide a clear, simple to operate and efficient manner of relating parameters at the central unit with parameters at a remote unit. Thus, for example, where a modification is to be made so as to report a new parameter from a remote unit to the central unit, a change needs to be made to the software in one or both units and it is desirable to provide a simple software structure that can readily be updated to make provision for such changes.

SUMMARY OF THE INVENTION

According to the present invention, there is provided a supervisory control and data acquisition system comprising a central unit and at least one remote unit and a communications link therebetween. The remote unit comprises a plurality of inputs and outputs for receiving data from and sending control signals to different elements of a second system being supervised and controlled and a tabular memory comprising storage locations in an 'x' dimension for storing data referring to different elements in the second system and storage locations in a 'y' dimension for storing data relating to different parameters of those elements. The central unit comprises, for each remote unit, a tabular memory for storing data corresponding to the data in the tabular memory of the remote unit. The system further comprises: transmitting means for transmitting a message from one unit to the other unit, said message comprising at least one pair of a 'y' dimension identifier (y or sub-y) and a qualifier, the qualifier of said pair defining conditions to be satisfied by information identified by the corresponding 'y' dimension identifier of said pair and a 'x' dimension identifier; means for locating the information defined by the 'y' dimension identifier; logic means for determining whether that information satisfies the conditions defined by the qualifier and means responsive to the logic means for selectively reading data from and writing data to a location or set of locations identified by the 'x' dimension identifier.

The invention provides for a clear and concise way of defining memory locations, allowing for rapid transfer of information based on very flexible logical operations which allow detailed or highly selective targeting of the information required.

It is preferred that the means responsive to the logic means are arranged to selectively read data from or write data to locations in said 'x' dimension at which the information identified by the 'y' dimension identifier satisfies the conditions defined by the qualifier. There may be a number of 'y' (or sub-'y') dimension identifiers, each with a corresponding qualifier. In this way, complex and powerful qualifiers may be set up.

The tabular memory of each of the central unit and the remote unit preferably comprise tables of storage locations extending in a 'z' dimension, and possibly further (sub-y) dimensions and the transmitting means may comprise means for transmitting a message comprising a 'z' part for identifying a table of storage locations in which the 'x' and 'y' parts of the message identify individual locations.

The tabular memory can equally be considered to have a tree-like structure as is explained below with reference to a preferred embodiment, which is now described by way of example only.

DETAILED DESCRIPTION OF THE PREFERRED EMBODIMENT

Figures 1, 2:
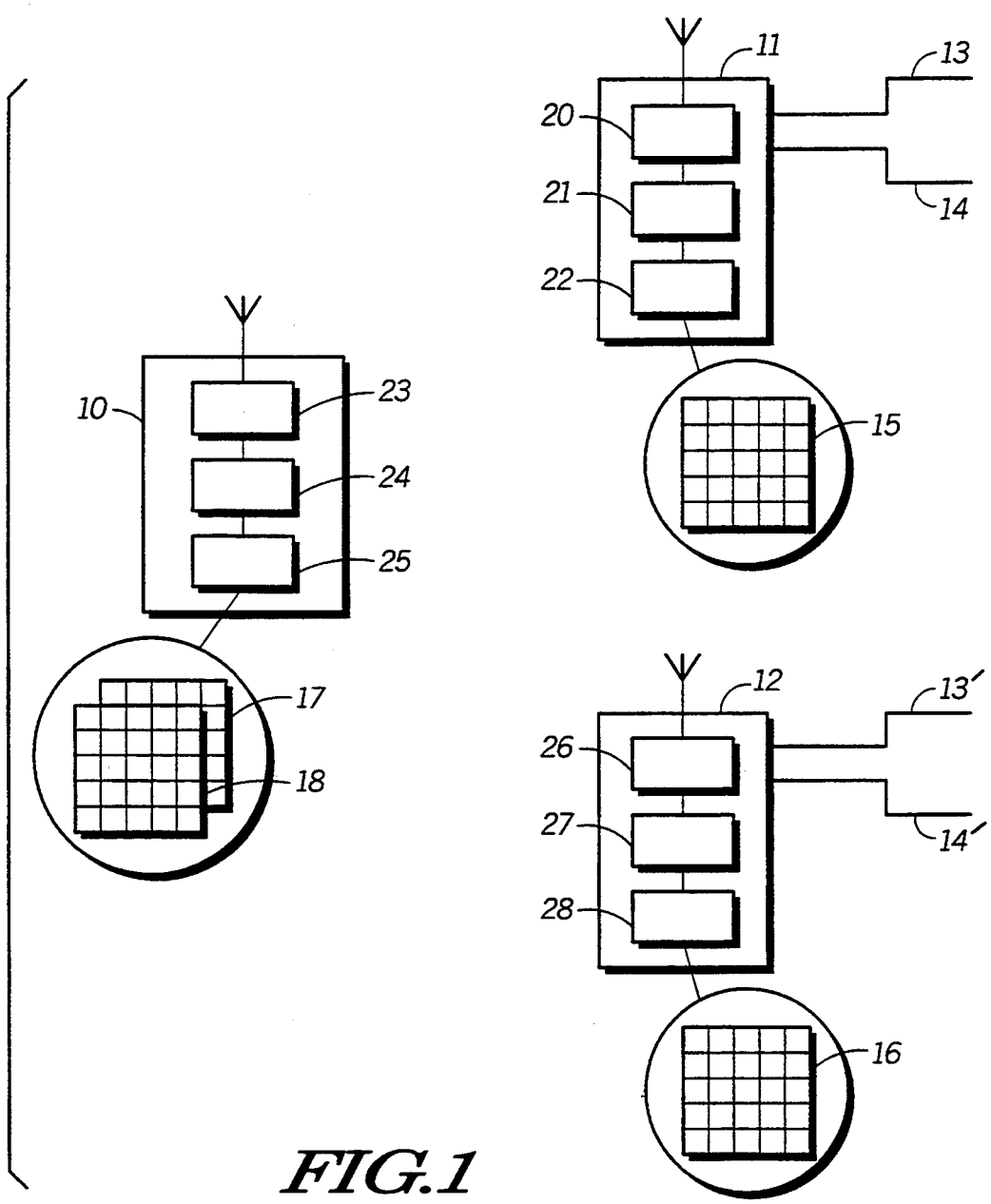
FIG. 1 shows a supervisory control and data acquisition system in accordance with the invention.
FIG. 2 shows a table of a remote unit of FIG. 1.

Referring to FIG. 1, there is shown a supervisory control and data acquisition system comprising a central unit 10 and a number of remote units, of which two are shown (11 and 12). Each of the remote units is connected to a system being controlled and monitored, by means of inputs and outputs 13 and 14, 13' and 14'. The system being controlled and monitored could be, for example, a security system or an irrigation system. There may be a number of inputs and outputs connected, for example, to alarm sensors and sirens in the case of a security system, or flow valves, flow meters, temperature sensors etc. in the case of an irrigation system. For the purposes of further illustration, the case of an irrigation system will be considered.

The remote unit 11 comprises a transmitter and receiver 20, a processor 21 and memory 22 shown in an inset as being arranged as a table 15 for storing parameters relating to the system it is controlling and monitoring. For example, the memory 22 will contain, for different valves, flow pipes, reservoirs etc. data relating to on/off status, flow rate, level indication, temperature, etc. This information is used for monitoring the irrigation system and reporting back to the central unit 10, or it is used for controlling the irrigation system by receiving commands from the central unit 10 (for example to change the status of a valve from closed to open). The remote unit 12 similarly comprises a transmitter and receiver 26, a processor 27 and memory 28 arranged as a table 16.

The central unit 10 comprises a receiver and transmitter 23, a processor 24 and a number of tables 17 and 18 in memory 25. Table 17 corresponds to table 15 of RTU 11 and table 18 corresponds to table 16 contained in memory 28 of RTU 12. Although all the tables have been shown in 2-dimensional form, it will be understood that, in the preferred embodiment of the invention, they extend over 3 dimensions. The tables could, of course, be 2-dimensional or multi-dimensional.

The central unit 10 communicates with the remote units 11 and 12 over a radio link, as is well known in the art, but the units can equally communicate over a land line, such as a wide area network.

Details of the preferred contention protocol of the System are described in UK Patent application number 9119186.6.

Referring to FIG. 2, details of one 2-dimensional part of table 15 are shown. The table shown comprises six columns and five rows. The columns are identified by an x co-ordinate and the rows are identified by a y co-ordinate. In a typical system, each of the columns represents, for example, a flow duct, and each of the rows represents a parameter such as valve on/off, flow rate, temperature etc. In the individual locations in the table, specific values are stored representing status, cubic meters per second, degrees centigrade, etc. The particular locations identified by crosses in the table of FIG. 2 can be identified by means of a data-base protocol or "specification". The protocol is a convenient and simple way of transporting tabular data-base information between the tables 15 and 17 of FIG. 1 or the table 16 and 18.

Figure 3:
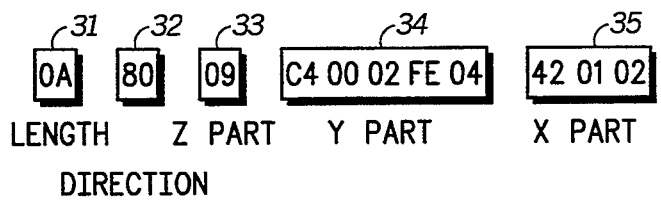
FIG. 3 shows an example of a message passing between the central unit and a remote unit of FIG. 1.

Referring to FIG. 3, there is shown an unqualified specification identifying the locations indicated in FIG. 2. The specification comprises a length part 31, a read-/write direction part 32, a z part 33, a y part 34 and an x part 35.

The length part 31 identifies the number of bytes of the total specification. In this case, it identifies that there are 10 bytes of the specification following the length part 31. The purpose of this is that it informs the receiving unit (either the central or the remote) to know when the message ends. The second part 32 is either "00" for "send" or "80" for "interrogate". In this case, it is the latter, meaning that the transmitting unit is interrogating the receiving unit.

The third part 33 of the message is the z co-ordinate, identifying the particular table (or layer) to be interrogated. In this case it is table number 9.

The fourth part 34 of the message commences with the hexadecimal numeral C, identifying that what follows is the y specification and the hexadecimal numeral 4, identifying the number of bytes of the y specification which follow. In this case there are 4 bytes as follows: "00", "02", "FE" and "04". The first of these bytes identifies row 0 and the next three bytes together form a command which means all rows from 02 to 04. An alternative to the command "FE" is the command "FD" which requests the rows to be transmitted in descending order. Thus the command "04 FD 02" means "send rows 4 to 2 in descending order".

The x part 35 commences with the byte "42", in which the hexadecimal digit "4" identifies that this is the x specification and the hexadecimal digital "2" identifies that there are two bytes to follow in the x part.

The specification of FIG. 3 uniquely identifies the indicated locations of the table of FIG. 2. It can be seen that the structure of the specification provides great flexibility in identifying different elements of different rows and columns, in a very compact format.

Figure 4:
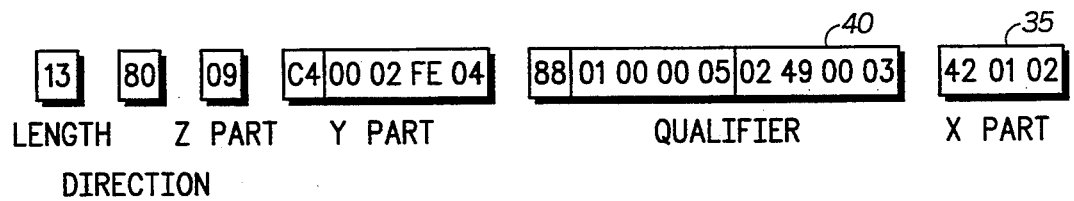
FIG. 4 shows a second example of a message passing between the central unit and a remote unit of FIG. 1.

FIG. 4 shows a message in which the Y part 34 has a qualifier 40 associated with it. In this example, the parts 31 to 34 have the same meaning as in FIG. 3, viz:

13 = length of the complete specification
80 = interrogation from sending unit (read cycle)
09 = table number
C4 = Y-list having a length equal to 4

The first two digits of the qualifier have the following meaning:

8 = qualifier code) i.e. "what follows is a qualifier";
8 = qualification list

The main part of the qualifier causes the following operation to be performed:

IF X1=5 AND X2>3 then fetch the "+" elements.

In other words the qualifier causes a logical operation to be performed on the data in the table being interrogated, and the results returned to the interrogating unit are dependent on the result of the operation. This reduces the amount of data that needs to be reported back. This is particularly advantageous where a large number of remote units have to be interrogated by a single central unit.

The manner in which the above logical operation is derived from the qualifier "01 00 00 05; 02 49 00 03" is as follows.

FIRST CONDITION

01 = co-ordinate of X
00 = eight bits of "zero", i.e. "0000 0000", of which the first three mean "if X is equal to", the fourth and fifth are a length indication and the sixth to eighth mean . . .
00 05 = value to which X is to be equated.

SECOND CONDITION

02 = co-ordinate of X
49 = 01001001, of which the first three bits (010) mean "if X is greater than", the fourth and fifth are a length indication, in this case showing that the number of conditions is 1; and the last three bits (in reverse Polish notation) indicate an AND operation;
00 03 = value to which X is to be compared.

As before, the final part 35 of the message is the X part and in this case indicates the X elements to be fetched.

A possible meaning of the above example is:

"for valves one and two, if the flow rate is 5 m³/s and the level is greater than 3 m, send the data for parameters 0, 2 and 3".

For each of the columns identified in the part of the message following the qualifier, the qualifier sets logical operations to be performed in specified rows (specified in the qualifier) and if those conditions are satisfied, the data specified by the y part is sent (or accepted) for that column.

The preferred complete set of logical operations and their 3-bit indications are as follows:

| | |
|---|---|
| 000 = equal | 001 = not equal |
| 010 > unsigned | 011 < unsigned |
| 100 > signed | 101 < signed |
| 110 AND | 111 XOR |

It can be arranged that the qualifier does not set conditions, but merely requires unconditional operations selected from the above set.

Figure 5:
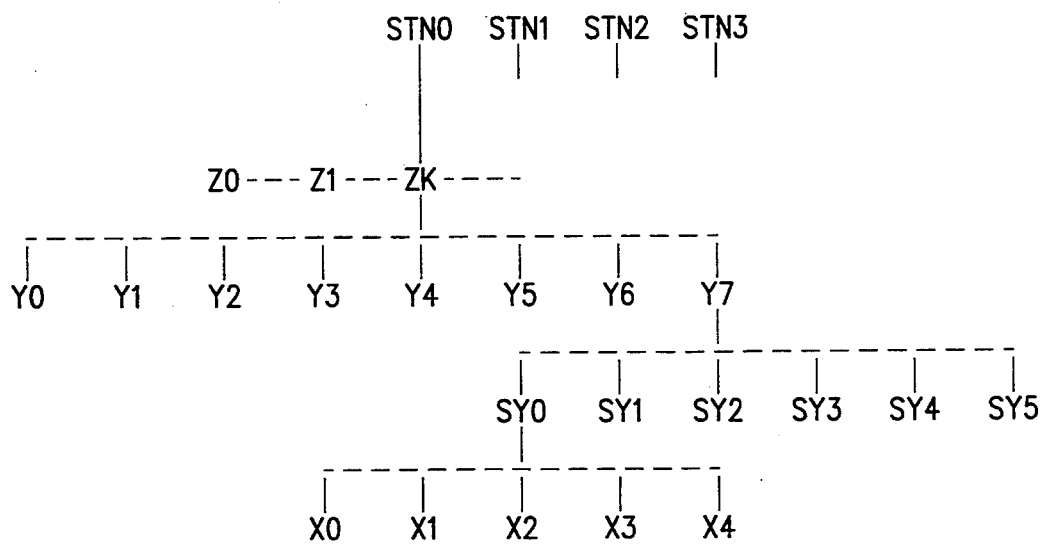
FIG. 5 shows a representation of a specification in the form of a tree-like hierarchical structure.

Referring to FIG. 5, the tables 17 and 18 which make up a data base in the central unit 10 are represented as a hierarchical data base. The specification transferred between the central unit and the remote unit are a way to represent groups of element co-ordinates in this hierarchical data base. Each element of data is uniquely defined by a set of co-ordinates. The top most co-ordinate is the number of the remote unit (station). Each station has a data base. The location of the data element is defined by the following co-ordinates: the category or the z level optionally a number of y levels (called sub-y levels) and one x level. The data elements are organised in a tree-like structure, as shown in FIG. 5, that may contain data in any leaf (which is approached via co-ordinate sequence zyyx or similar). The specification is a way to describe one or many such elements. The software in the central unit or the remote unit is able to disassemble the joint specification to a list of single element co-ordinates.

The tree-like structure is merely another way of representing the tabular N-dimensional data base (in FIG. 5 there are 4 dimensions shown), since there may be areas of the tabular representation that are unoccupied.

With reference to FIG. 5, it can be noted that the number of sub-y levels is arbitrary and that the data itself resides as an x element.

Further details of a specification format are given in the following example. In this example, the following notations have the following meanings:

< >—element
    []—optional
    {}—possibly many times (or none)

The format of a single specification is:
    <spec> = <Total length>{<spec-k>}

The <spec> consists of several <spec-k>'s that are preceded by one byte that contains the total length of all <spec-k>'s:

<spec − k> = <Flags><Z − spec> [{<Y − spec>}{<Y − spec><Q − spec>}{<X − spec>}]

The <spec-k> consists of: Z description, optionally some Y (mid-levels) descriptions, possible QUALIFICATION (condition on Y level) and X description. Note that the Y levels other than the first are also called Sub-Y (SY).

The composition of the above elements is as follows:
    <Flags>: One byte

If MSB=1, this means "interrogation from unit to central". If MSB=0, this means "transmit from central to unit".

<Z-spec>: One byte comprising Z (category) under 0–255.
    <Y-spec>: <Y-id, length><list>

The first item is a leader byte that consists of: 2 bits that identify that this is a Y ID. The 6 least bits are the length of <Y-spec> NOT including this first byte. <LIST> is defined below.

<X-spec>: <X-id, length><List>

The first item is a leader byte that consists of: 2 bits that identify X ID. The 6 least bits are the length of <X-spec> NOT including the first byte.

<List> is a combination of bytes that describes co-ordinates of X level or of Y level.

There now follows a number of optional possibilities.
    X-level: 0–127

If MSB is one, this is an X DEFAULT value. The co-ordinate is the seven least significant bits, but the value of the element is not the value which comes from the database: it is some default value which does not reside in the database. In such a case, the item value is not transmitted or received: it is some predefined value.

Y-level: 0-$FA is the actual co-ordinate number.
    253 ($FD): DOWN TO code. That is, all co-ordinates DOWN To next byte co-ordinate: 4 $FD 0 is {4,3,2,1,0}.
    254 ($FE): UP TO Code. That is, all co-ordinates UP TO next byte co-ordinate: 0 $FE 4 is {0, 1, 2, 3, 4}. Note: <List>=$FE 4 is same as 0 $FE 4, that is, default base for UP TO is 0.
    255 ($FF)" "UP END" code. That is, current co-ordinate and all that follows are taken. To know what is the end, an external routine is invoked because this information is not coded within the spec.

These codes can be used in any order, such as: 1 $FE 3 7 $FF, which means {1, 2, 3, 7, 8, 9 10} if the end is 10.

The qualifier specification is as follows:
    <Q-spec> = <Q-id, length><cond>{<cond>}

The first leader byte consists of: 2 bits that identify the Quality ID and 6 least bits that are the length of <Q-spec> NOT including first byte.

Note: a <Q-spec> is not admissible without at least one <Y-spec> in front of it in <spec>.

Qualification is a method, in RUN TIME, to prune the branches of the database tree that MDLC has to take care of. That is, to QUALIFY or DISQUALIFY any branch in the current level. If it qualifies, the current vertex is taken. If not, it is skipped.

The qualifications are used to compare a certain database element to another value that can be some immediate value or some other data base element. It is implemented as follows:
    <cond> = <Xk-description><opcode><Compared value>

The "Condition" (<cond>) consists of three parts. The <Xk-description> which is the item on which to perform the check, the <opcode> which is what to do how to compared and what to do with the result, and <Compared value> which is the immediate value or element co-ordinate with which to compare. These various elements are as follows.

<Xk-description>

If the most significant bit of Xk=0 then the qualification's structure is:
    Xk co-ordination
    (z && y are known in this situation from the spec.)
    If Xk (msb)=1 then the qualification's structure is:
    if Xk 10000xxx.

This structure provides a very powerful tool for constructing qualifier operations and combinations, not just on the particular branch of the "tree" to which the specification currently leads, but also to other tables, columns, rows etc.

1) if xxx=000 then an element in another table is selected and the same "Y" co-ordinate is checked.
   <Xk> <Z> <Xi> <OPCODE> <IMMIDIATE VALUE>
2) xxx=111 is used to enhanced the range of X up to 255.
   <Xk> <enhanced X> <OPCODE> <IMMIDIATE VALUE>
3) other values of xxx (001-110) will indicate number of 'Y' levels.
   <Xk> <Z> <Y1> . . . <Yn> <Xi> <OPCODE> <IMMIDIATE VALUE>
If Xk = 10010xxx
   <Xk> <OFFSET IN A TABLE OF USER ROUTINES> <PARAMETER> the <PARAMETER> length of the routine is determined as follows:
   if xxx=000 NO Parameter
   if xxx=001 1 Byte Parameter
   if xxx=010 2 Byte Parameter
   if xxx=011 3 Byte Parameter
   if xxx=100 4 Byte Parameter
   <opcode>:
1. The most significant 3 bits are the operation opcode. The 8 possibilities are: EQ, NE, unsigned GT, unsigned LT, signed GT, signed LT, Bitwise OR, Bitwise AND
2. The least significant 5 bits describe what to do with the comparison result, which is a YES or a NO. The result is pushed into a stack-like data structure (This works in RPN—Reverse Polish Notation). Now it is possible to define logic operations between the head of the stack and its predecessor. The first 2 bits of this field (the middle 2 bits of the byte) define the number of logic operations that are to be made. If 3, this means that after the new result is pushed onto the stack, 3 times logical operations are performed, each with the top of the stack and its predecessor. The result will replace both as the head of the stack. So there can be 0-3 logical operations. The logical operations can be AND or OR. This is defined by the 3 least significant bits. Each bit is used to determine the type of a possible logical operation. If there are less than 3 logical operations, the irrelevant bits are ignored.

At the end of the CONDITION PARSING, there should be only one element in the stack that is the result.
<Compared value>
This can be an immediate value the length of which is same as the length of the element described in the <Nk-description>.
<Compared value> = <Immediate value> or
This can be the external user qualification routine parameter.

By virtue of the possibility of having a number of conditions, as indicated by the optional extra specification portions { <Y-spec> <Q-spec> } and { <cond> } above, in the qualifier specification, complex and powerful qualifiers can be built up, with a number of sub-y elements, each followed by a condition, where the complete qualifier defines a set of logical operations to be performed on different elements or sets of elements, not necessarily in the same table, row or column, i.e. not necessarily in the same branch of the tree, and with the down-loading of information from the central unit to the remote unit, or the up-loading of information in the other direction, being dependent on the complex qualifier being satisfied.

When the qualifiers are not satisfied, a negative result is returned to the interrogating unit.

When a specification is passed from the central unit to a remote unit and the specification incorrectly defines a nonexistent branch of the tree, an error code is returned to the central unit together with the identity of the specification part that gave rise to the error. For example: wrong z, wrong y, syntax error in qualifier, etc. Errors are reported in the opposite direction in a similar manner.

Thus, a supervisory control and data acquisition system has been described which has the advantage that every element of the data base can be reached in a unique concise manner. Complete tables can be accessed in a short time or tables can be cut in a short time. Cuttings of tables can be made by a "smart", i.e. Boolean logic, qualification. For example, "if the flow rate is 5 meters$^3$/s and the level is greater than 3 meters and smaller than 6 meters, then send the data".

Qualifiers can be set up to request the down-loading of information from elements of the system under supervision, where the particular elements which will respond are not known at the outset, but depend on the results of the qualifier.

Qualifiers are not limited to setting conditions dependent on information defined by a particular branch of the tree or particular table to which the specification "points". On the contrary, qualifiers can set conditions dependent on information from other branches or tables.

The communication is clear and rapid. A large specification can be sent or received including a number of small specifications. Specifications can be defined to send data or to make interrogations. Errors are returned in a clear manner.

We claim:

1. A supervisory control and data acquisition system comprising a central unit and at least one remote unit and a communications link therebetween,
   wherein the remote unit comprises a plurality of inputs and outputs for receiving data from and sending control signals to different elements of a second system supervised and controlled and a tabular memory comprising storage locations in an 'x' dimension for storing data referring to different elements in the second system and storage locations in a 'y' dimension for storing data relating to different parameters of those elements,
   and wherein the central unit comprises, for each remote unit, a tabular memory for storing data corresponding to the data in the tabular memory of the remote unit,
   the system comprising transmitting means to transmit a message from the central unit to the at least one remote unit, said message comprising:
   at least one 'x' dimension identifier for defining at least one set of values in the 'x' dimension;
   at least one first 'y' dimension identifier (y or sub-y) for defining at least one set of values in the 'y' dimension and
   at least one pair of a second 'y' dimension identifier (y or sub-y) and a qualifier, the second 'y' dimension identifier of the pair identifying, for each defined value in the 'x' dimension, one or more storage locations in the tabular memory of the remote unit, and the qualifier of said pair defining conditions to be satisfied by information stored in the storage locations thus identified; and processing means arranged to locate the information stored in the one or more storage locations identified by the second 'y' dimension identifier, to determine whether that information satisfies the conditions defined by the qualifier and selectively to read data from and write data to the location or set of locations identified by the 'x' dimension identifier and the first 'y' dimension identifier, depending on whether said information satisfies said conditions.

2. A system according to claim 1, wherein the processing means are arranged to selectively read data from or write data to locations in said 'x' dimension at which the information identified by the 'y' dimension identifier satisfies the conditions defined by the qualifier.

3. A system according to claim 1, wherein the message comprises more than one pair of a 'y' dimension identifier (y or sub-y) and a qualifier and wherein the processing means are arranged to determine whether the information defined by each 'y' dimension identifier satisfies the conditions defined by its corresponding qualifier.

4. A system according to claim 3, wherein the tabular memory of each of the central unit and the remote unit comprises tables of storage locations extending in further dimensions and the processing means and transmitting means are arranged to transmit a message comprising at least two pairs of a 'y' dimension identifier (y or sub-y) and a qualifier, wherein the 'y' dimension identifiers of the at least two pairs of 'y' dimension identifiers (y or sub-y) and qualifiers identify storage locations in different dimensions (y and sub-y).

5. A system according to claim 1, wherein the message includes an indication of the number of pairs of 'y' dimension identifiers and qualifiers in the message.

6. A system according to claim 1, wherein the tabular memory of each of the central unit and the remote unit comprises tables of storage locations extending in a 'z' direction and the processing means and transmitting means are arranged to transmit a message comprising a 'z' part for identifying a table of storage locations in which the 'x' and 'y' parts of the message identify individual locations.

7. A system according to claim 6, wherein the tabular memory of each of the central unit and the remote unit comprises tables of storage locations extending in further dimensions and the processing means and transmitting means are arranged to transmit a message comprising a part for identifying locations in said further dimensions.

8. A system according to claim 1, wherein a storage location is uniquely defined by the following co-ordinates: a z level, optionally a number of y levels, and one x level.

9. A system according to claim 1 wherein each remote unit is arranged to receive the message transmitted from the central unit and arranged to retransmit an error signal when the message received defines a nonexistent storage location at the remote unit.

10. A supervisory control and data acquisition system comprising a central unit and at least one remote unit and a communications link therebetween,
wherein the remote unit comprises a plurality of inputs and outputs for receiving data from and sending control signals to different elements of a second system being supervised and controlled and a memory organized in a tree-like structure comprising branches and leaves, different branches relating to different parameters of the elements of second system and different leaves being storage locations for storing data relating to different elements,
and wherein the central unit comprises, for each remote unit, a tree-like memory for storing data corresponding to the data in the memory of the remote unit,
the system further comprising:
transmitting means for transmitting a message from the central unit to the at least one remote unit, said message comprising:
at least one leaf identifier, for identifying at least one leaf representing for each branch at least one individual storage location in the memory of the remote unit;
at least one first branch identifier (y or sub-y), for identifying at least one branch representing at least one set of individual storage locations in the memory of the remote unit;
at least one pair of a second branch identifier (y or sub-y) and a qualifier, the qualifier of said pair defining conditions to be satisfied by information identified by the second branch identifier (y or sub-y) of said pair; and
processing means for selectively reading data from and writing data to the at least one individual storage location identified by the leaf identifier (x) and the first branch identifier (y or sub-y), dependent on the satisfying of the conditions defined by the qualifier.

11. A system according to claim 10, wherein the transmitting means are receiving and transmitting means which are arranged to receive the message transmitted from the one unit to the other unit and to transmit a message comprising a number of pairs of branch identifiers and qualifiers, and the processing means are arranged to act on a message received only if all the pairs of qualifiers are satisfied.

12. A system according to claim 11, wherein the processing means are arranged to read data from or write data to a data base location or set of locations identified by the leaf identifier.

13. A method of operation of a supervisory control and data acquisition system comprising a central unit and at least one remote unit and communications link therebetween, wherein the remote unit comprises a plurality of inputs and outputs for receiving data from and sending control signals to different elements of a second system being supervised and controlled and a tabular memory comprising storage locations in an 'x' dimension for storing data referring to different elements in the second system and storage locations in a 'y' dimension for storing data relating to different parameters of those elements, and wherein the central unit comprises, for each remote unit, a tabular memory for storing data corresponding to the data in the tabular memory of the remote unit, the method comprising the steps of:
transmitting a message from the central unit to the at least one remote unit, said message comprising:
at least one 'x' dimension identifier for defining at least one set of values in the 'x' dimension;
at least one first 'y' dimension identifier for defining at least one set of values in the 'y' dimension, and
at least one pair of a second 'y' dimension identifier (y or sub-y) and a qualifier, the second 'y' dimension identifier of the pair identifying, for each defined value in the 'x' dimension, one or more storage locations in the tabular memory of the remote unit, and the qualifier of said pair defining conditions to be satisfied by information stored in the storage locations thus identified;

locating, at the remote unit, the information defined by the second 'y' dimension identifier, determining whether that information satisfies the conditions defined by the qualifier and selectively reading data form and writing data to a location or set of locations identified by the 'x' dimension identifier and the first 'y' dimension identifier, depending on whether said information satisfies said conditions.

14. A method of operation of a supervisory control and data acquisition system comprising a central unit and at least one remote unit and a communications link therebetween, wherein the remote unit comprises a plurality of inputs and outputs for receiving data from and sending control signals to different elements of a second system being supervised and controlled and a memory organised in a tree-like structure comprising branches and leaves, different branches relating to different parameters of the elements of second system and different leaves being storage locations for storing data relating to different elements, and wherein the central unit comprises, for each remote unit, a tree-like memory for storing data corresponding to the data in the memory of the remote unit, the method comprising the steps of:

transmitting a message from the central unit to the at least one remote unit, said message comprising:

as least one leaf identifier, for identifying a leaf on one or more branches representing for each branch an individual storage location in the memory of the remote unit;

at least one first branch identifier (y or sub-y), for identifying at least one branch representing at least one set of individual storage locations in the memory of the remote unit;

at least one pair of a second branch identifier (y or sub-y) and a qualifier, the qualifier of said pair defining conditions to be satisfied by information identified by the second branch identifier (y or sub-y) of said pair; and selectively reading data from and writing data to one or more selected individual storage locations identified by the leaf identifier (x) and the first branch identifier (y or sub-y), dependent on the satisfying of the conditions defined by the qualifier.

* * * * *